March 1, 1949.     F. E. WILLIAMS     2,463,449
CADMIUM PYROPHOSPHATE PHOSPHOR
Filed May 4, 1946
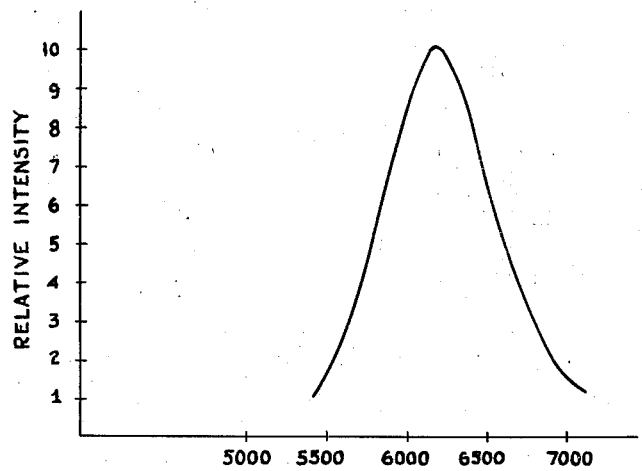
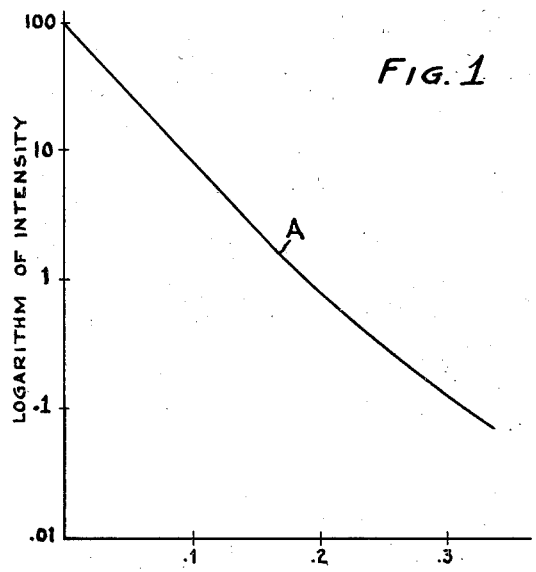
INVENTOR.
FERD E. WILLIAMS
BY William A. Zalesak Patented Mar. 1, 1949

2,463,449

UNITED STATES PATENT OFFICE 2,463,449

CADMIUM PYROPHOSPHATE PHOSPHOR

Ferd E. Williams, Princeton, N. J., assignor to Radio Corporation of America, a corporation of Delaware Application May 4, 1946, Serial No. 667,466

2 Claims. (Cl. 252—301.6)

This invention relates to materials for production of luminescence by corpuscular or radiant energy excitation.

It is an object of the invention to provide a phosphor material having a substantially true exponential decay rate.

Another object of the invention is to utilize a cadmium pyrophosphate as a phosphor material having a substantially true exponential decay rate.

Other objects will appear in the following description, reference being had to the drawings, in which:

Fig. 1 is a graph showing the decay characteristics of the improved phosphor.

Fig. 2 is a graph showing the intensity of luminescence of the phosphor at various wave lengths.

Cadmium orthophosphates have heretofore been proposed for use as phosphors for fluorescent lighting (see English Patent 469,731—1937). This orthophosphate does not have a true exponential characteristic and also it has a long "tail" of phosphorescence that renders it unsuitable for certain uses outside the fluorescent lighting field. Phosphors used in position location, such as radar uses, should decay exponentially for a relatively long period and then suddenly blank out. This decay to substantial extinction should be in the neighborhood of 0.1 second to 10 seconds depending on scanning frequency.

I have found that an improved phosphor can be obtained by using the pyrophosphate of cadmium with manganese activator. Cadmium pyrophosphate with manganese activation has a true exponential decay characteristic and the light, after reaching a low level, rather suddenly blanks out. This may be written as $$Cd_2P_2O_7 : .02\ Mn$$

The .02 gram of manganese is 2 mole per cent. By this is meant that for every mole of cadmium pyrophosphate, there is 2 per cent of a mole of manganese. Manganese concentrations between 0.5 mole per cent and 5 mole per cent may be used, with optimum performance at about 2 mole per cent.

My improved pyrophosphate phosphor may be prepared by adding 5 milliliters of 0.10 gram molar manganese solution, such as the nitrate, to 14.67 milliters of 3.41 gram molar cadmium solution, such as the nitrate, and the solution is then diluted to about 50 milliliters in a 200 milliliter Pyrex beaker. Thirteen milliliters of 3.85 molar of diammonium hydrogen phosphate $$(NH_4)_2HPO_4$$

is then slowly added, with stirring. The reaction taking place is as follows:

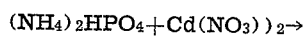

The resulting product is evaporated to dryness on a steam bath and then dehydrated at 150° C. in an oven. After thorough grinding, the powder is heated at 900° C. for a half hour in a relatively neutral atmosphere. The reaction is as follows:

$$2CdNH_4PO_4 \rightarrow Cd_2P_2O_7 + 2NH_3 + H_2O$$

About 10% excess of ammonium hydrogen phosphate $(NH_4)_2HPO_4$ may be used to insure complete precipitation of the cadmium ammonium phosphate $Cd(NH_4)PO_4$, without appreciably affecting the luminescent character of the product.

Heating at any temperature from 700° C. to 1100° C. produces a satisfactory product, but heating at 900° C. produces the most efficient phosphor.

The decay characteristic of my improved phosphor of cadmium pyrophosphate is shown by graph A of Fig. 1 in which the abscissas are time in seconds and the ordinates are common logarithm of relative intensity values. This characteristic is substantially a straight line down to very low values. Since the ordinates are logarithms and the abscissas seconds, the decay characteristic of my improved phosphor is a true exponential curve.

Fig. 2 shows the intensity of my improved phosphor at various wave lengths. The ordinates are relative values.

While my improved phosphor is especially suited for targets of radar tubes excited by cathode ray beams, it also may be used for devices in which it is excited by other corpuscular or undulatory energy.

I claim:

1. A phosphor material consisting of cadmium pyrophosphate and 0.5 mole percent to 5 mole of manganese.

2. A phosphor material consisting of cadmium pyrophosphate and 2 mole percent of manganese.

FERD E. WILLIAMS.

REFERENCES CITED

The following references are of record in the file of this patent:

UNITED STATES PATENTS

| Number | Name | Date |
|---|---|---|
| 2,270,124 | Huniger | Jan. 13, 1942 |
| 2,306,567 | Roberts | Dec. 29, 1942 |

FOREIGN PATENTS

| Number | Country | Date |
|---|---|---|
| 469,731 | Great Britain | July 27, 1937 |